US008311978B2

(12) United States Patent
Maniscalco et al.

(10) Patent No.: US 8,311,978 B2
(45) Date of Patent: *Nov. 13, 2012

(54) COMPUTER ENABLED METHODS TO INHIBIT FILE AND VOLUME NAME COPYING AND TO CIRCUMVENT SAME

(75) Inventors: Anthony Maniscalco, San Carlos, CA (US); Michael Yates, North Las Vegas, NV (US)

(73) Assignee: Rovi Solutions Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/020,761

(22) Filed: Feb. 3, 2011

(65) Prior Publication Data

US 2012/0005757 A1 Jan. 5, 2012

Related U.S. Application Data

(63) Continuation of application No. 12/069,293, filed on Feb. 7, 2008, now Pat. No. 8,108,336.

(60) Provisional application No. 61/002,145, filed on Nov. 6, 2007.

(51) Int. Cl.
*G06F 7/00* (2006.01)
*G06F 17/00* (2006.01)

(52) U.S. Cl. .................. 707/609; 707/821; 705/57

(58) Field of Classification Search ............ 707/609, 707/821; 705/57
See application file for complete search history.

(56) References Cited

U.S. PATENT DOCUMENTS

| 7,584,089 B2 * | 9/2009 | Kuwata et al. .................. 704/7 |
| 8,108,336 B2 | 1/2012 | Maniscalco et al. |
| 2002/0049748 A1 * | 4/2002 | Iki et al. ........................ 707/2 |
| 2003/0101217 A1 * | 5/2003 | Aiyoshi et al. ............... 709/203 |
| 2003/0135495 A1 * | 7/2003 | Vagnozzi ....................... 707/3 |
| 2003/0182128 A1 * | 9/2003 | Kuwata et al. ............ 704/270.1 |
| 2004/0236874 A1 * | 11/2004 | Largman et al. ................ 710/8 |

(Continued)

FOREIGN PATENT DOCUMENTS

JP 2004-302704 A 10/2004

(Continued)

OTHER PUBLICATIONS

DVDFab.com, Fengtao Software Inc., Print out from web archive http://web.archive.org/web/20070812005136/http://www.dvdfab.com/dvd-fab-platinum-new.htm, Aug. 12 2007, 8 pages.*

(Continued)

*Primary Examiner* — Phong Nguyen
(74) *Attorney, Agent, or Firm* — Morrison & Foerster LLP

(57) ABSTRACT

Provided here is a copy protection method and apparatus to confuse currently available personal computer software (and other content) copying packages by use of unexpected ("illegal") special characters in the volume (or directory) name for the software or other content or data subject to being copied. This method can be used alone or with a broad range of other known copy protection technologies such as RipGuard (available from Macrovision Corp.). Also provided here is a method and apparatus to defeat the confusion method, thereby allowing copying of such copy protected software.

7 Claims, 4 Drawing Sheets

U.S. PATENT DOCUMENTS

| | | | |
|---|---|---|---|
| 2004/0268006 A1* | 12/2004 | Kang et al. | 710/303 |
| 2005/0080612 A1* | 4/2005 | Chai et al. | 704/5 |
| 2006/0087942 A1* | 4/2006 | Ahuja | 369/47.12 |
| 2007/0005614 A1* | 1/2007 | Dodge | 707/100 |
| 2007/0022116 A1 | 1/2007 | Smith | |
| 2007/0220347 A1* | 9/2007 | Kirtkow et al. | 714/38 |

FOREIGN PATENT DOCUMENTS

| | | |
|---|---|---|
| JP | 2005-092560 A | 4/2005 |
| JP | 2005-227981 A | 8/2005 |
| KR | 20040011001 A | 2/2004 |

OTHER PUBLICATIONS

Jacci Howard Bear, How to Create an Ellipsis, About Desktop Publishing, Print out from web archive http://web.archive.org/web/20050526165145/http://desktoppub.about.com/cs/finetypography/ht/ellipsis.htm, May 26, 2005, 2 pages.*

International Search Report mailed on Jun. 22, 2009, for PCT Application No. PCT/US2008/082370, filed on Nov. 4, 2008, seven pages.

Written Opinion mailed on Jun. 22, 2009, for PCT Application No. PCT/US2008/082370, filed on Nov. 4, 2008, four pages.

* cited by examiner

COMPUTER ENABLED METHODS TO INHIBIT FILE AND VOLUME NAME COPYING AND TO CIRCUMVENT SAME

CROSS REFERENCE TO RELATED APPLICATION

This continuation application claims priority to U.S. application Ser. No. 12/069,293, filed Feb. 7, 2008, the entire contents of which are hereby incorporated by reference which in turn claims priority to U.S. Provisional Application No. 61/002,145 filed on Nov. 6, 2007, the entire contents of which are hereby incorporated by reference.

FIELD OF THE INVENTION

Prevention of computer content and software (including data) copying, and a method to defeat same.

BACKGROUND

Software and content piracy (unauthorized copying) by "hackers" or commercial entities is a major commercial problem worldwide. A substantial portion of the software and digital content actually purchased by consumers is illegally copied, that is it is copied without regard to the copyright rights of the actual owners. Computer software and content typically being distributed on digital media is readily copied. The legal weapons against such illegal copying or piracy are relatively weak and hard to enforce.

Therefore there has developed the field of copy protection, which refers to technology to frustrate such copying rather than to the legal remedies available to copyright owners. A variety of copy protection schemes have been developed over the years generally for digital data and media, and these also apply to computer software. One current software copy protection technique includes a dongle, which is a piece of hardware containing an electronic serial number that must be plugged into the computer to run the protected software. This adds substantial cost for the software publisher. Another method is bus encryption, an encrypted code for use in secure cryptosystems. This is typically only used in high security environments such as for financial transactions. Another technique is a registration key used when running a computer program (software) and required to execute the program (software). It is also known to use code morphing or code obfuscation which hides the execution logic of the protected software code. Most of these copy protection schemes create extra expense for the software vendor or extra trouble for the software user in terms of installation and use.

A typical personal computer copying scheme (program) of the type widely available to hackers and others provides a disk image of the file to be copied. Some of these schemes actually bypass certain known copy protection schemes. Some copy programs are intended for use in the game field, and others in the general computer software field.

Generally there is an ongoing competition between the hackers or pirates who wish to make illegal/unauthorized copies of commercially available software and the software vendors and content providers who wish to prevent such copying by technical means. Therefore there is an ongoing need for new copy protection methods.

SUMMARY

Provided here is a copy protection method and apparatus to confuse currently available personal computer software (and other content) copying packages by use of unexpected ("illegal") special characters in the volume (or directory) name for the software or other content or data subject to being copied. This method can be used alone or with a broad range of other known copy protection technologies such as RipGuard (available from Macrovision Corp.). Also provided here is a method and apparatus to defeat the confusion method, thereby allowing copying of such copy protected software.

DETAILED DESCRIPTION

Copy Prevention Method

This disclosure is directed to modifying the way copyrighted content (including software and other data) on an optical disc or other computer storage media is authored (created) such that special characters are included in the associated volume name, for the purpose of thwarting attempts to make an unauthorized copy by use of a general purpose computing copying product. A "volume" in computer science conventionally refers to a single accessible storage (memory) area with a single file system, typically resident on a single partition of a hard disk drive. A volume is also called a logical drive. Both Windows and UNIX type operating systems use volumes.

The Apple Macintosh operating systems, such as MAC OS X Leopard also use volumes, as does Linux (a UNIX type operating system).

The usual practice employed in the creation of a volume name is to use one or more standard ASCII characters or keyboard characters which are recognized and accepted by operating systems and application software of various cross platform-computing products. Many applications used in making unauthorized copies of copy protected content use the volume name of the content to establish a directory and/or filename on the hard disk drive of the computer that is being used to make the copy. Thus, although the characters used in the volume name may not be critical for access or the playback of the original content (such as stored on an optical disc), it can be critical in the process of attempting to make a copy of the content.

By inserting certain 'unrecognizable' characters, 'illegal filename' characters or non-standard keyboard characters into the name of the volume, it has been found that some existing software applications and/or operating systems will fail in their attempt to create a file or directory with that volume name. This results in an aborted and unsuccessful attempt to make the unauthorized copy. Each operating system specification specifies which are the relevant characters, also referred to here as special characters.

Figure 1:
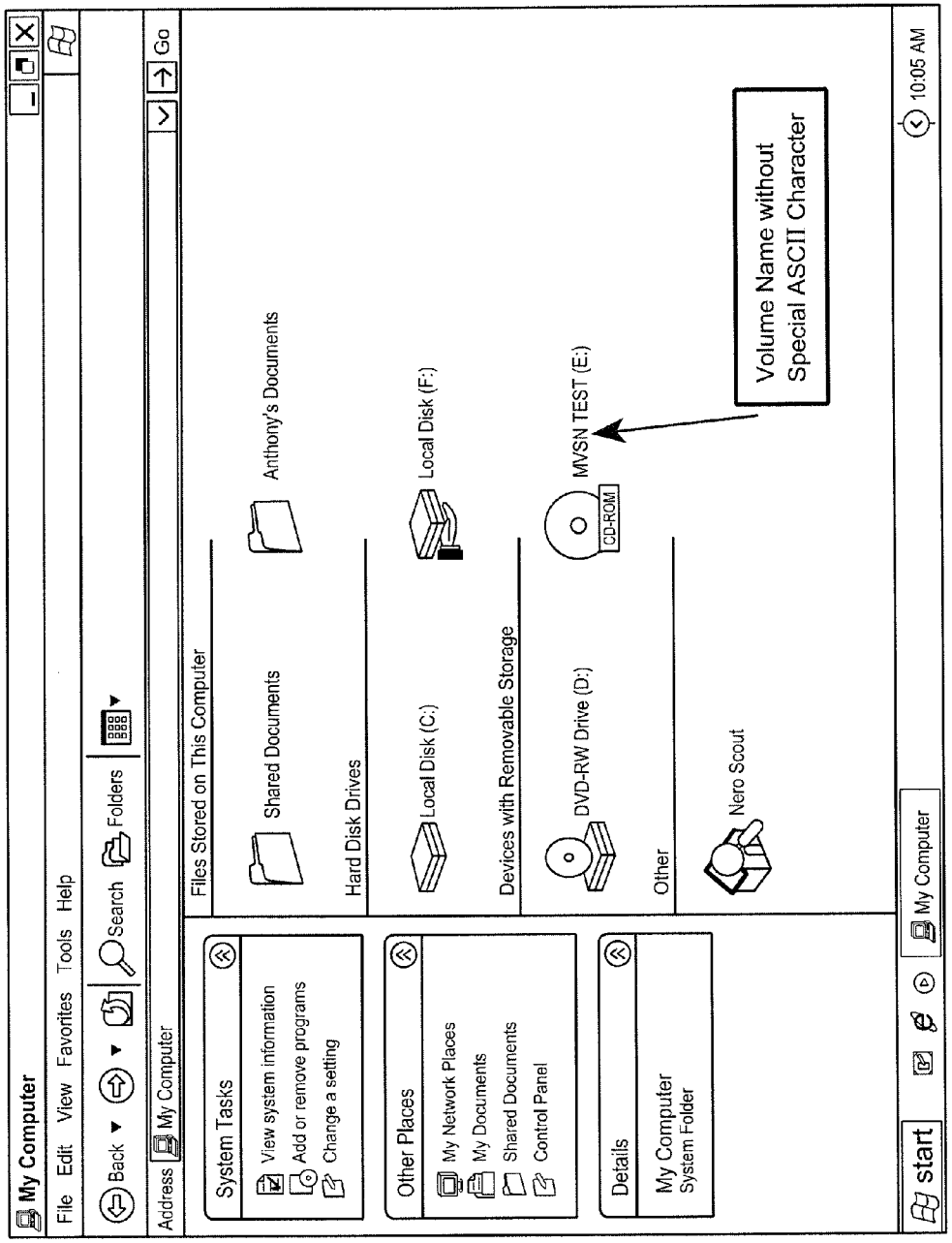
FIG. 1 shows a set of volume names for the Windows operating system.
Figure 2:
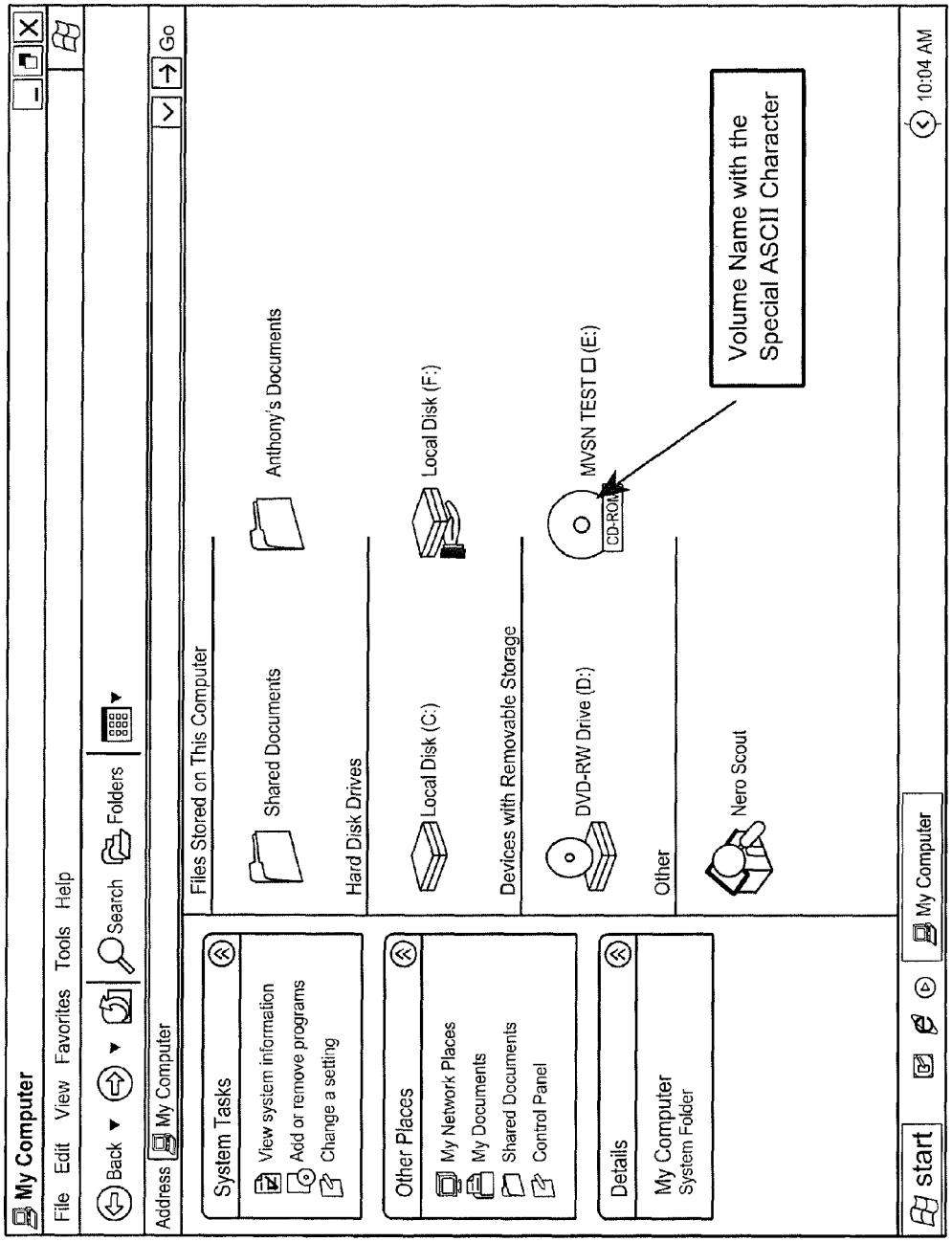
FIG. 2 shows a volume name with a special character.

Presented here is an example (in the Windows context) for altering a volume name of an optical disc storage. FIG. 1 shows in a conventional "screen shot" several volumes, with one conventional volume name as "MVSN TEST". The present method would insert, modify, replace or substitute one or more special characters in the volume name as shown in the example of FIG. 2: "MVSN TEST . . . ". In this example, the added special character is the horizontal ellipsis symbol '. . .' which is placed at the end of the volume name.

This character can be generated by some word processing programs using the ASCII character code for the symbol, 133. More specifically, in this example the character was generated via a standard PC (personal computer) keyboard using the shortcut key method of Alt plus '0133' from a numeric PC keypad. While this particular character would be accepted by the file naming convention of most Windows operating systems, it was found that this character foils the copy attempt by several currently available copying applications (programs).

There are several other special characters that can be employed such as the 'illegal filename characters' prohibited by most Windows operating systems: \ / : * ? " < > | " . By judiciously adding these and/or other ASCII characters and/ or ANSI Extended ASCII characters and/or non-standard keyboard characters, a volume name can be used that will provide protection from unauthorized copying while not negatively impacting playback or use of the original content of the volume.

For MAC OS X Leopard, unrecognizable, illegal or non-standard keyboard filename characters are the forward slash (/), the NUL (which marks the end of a name) and the colon (:). For UNIX-type including Linux operating systems such characters are the forward slash (/) which is the directory separator and NUL (or NIL).

Circumvention Method

Also disclosed here is a complementary "defeat" method or circumvention technique to allow copying of content or other data resident on optical disc or storage media (typically in the form of a computer file or files) that is copy protected by use of 'unrecognizable', 'illegal filename' or non-standard keyboard characters in the volume name as described above, so that the copy protected content can be successfully copied onto a hard disc drive or other recordable media. Generally in the U.S. such copyright defeat technologies are illegal under the Digital Millennium Copyright Act (DMCA); hence the current description is not intended to advocate, endorse or recommend use of same.

The first example of such a method of creating an unauthorized copy from a file which has earlier been copy protected as described above is to create a new generic (and conforming to the operating system specification) volume or directory name (such as MVSN_Test or any generic volume or directory name) on the hard disk drive or other storage media and process the associated files to the new directory or volume, thereby giving the new volume or directory a conforming name and where its content is a copy of that of the protected file.

The second example of such a method of creating an unauthorized copy is to create a new user defined and conforming volume or directory name (such as: MY_DIRECTORY or any generic name) on the hard disk drive or any storage media and similarly process the associated files to the new directory or volume.

The third example of such a method of creating an unauthorized copy is to check character by character in the copy protected volume or directory name for any 'unrecognizable', 'illegal filename', or non-standard keyboard characters and create a new volume or directory with the same content and a similar name but without those 'unrecognizable' characters or 'illegal filename' characters in the new conforming name, and process the associated files to the new volume or directory.

The fourth example of such a method of creating an unauthorized copy is to check character by character in the copy protected volume or directory name for 'unrecognizable' characters or 'illegal filename' or non-standard keyboard characters and remove those 'unrecognizable' characters, 'illegal filename' characters or non-standard keyboard characters to create the new conforming name, and process the associated files to the new volume or directory.

Figure 3:
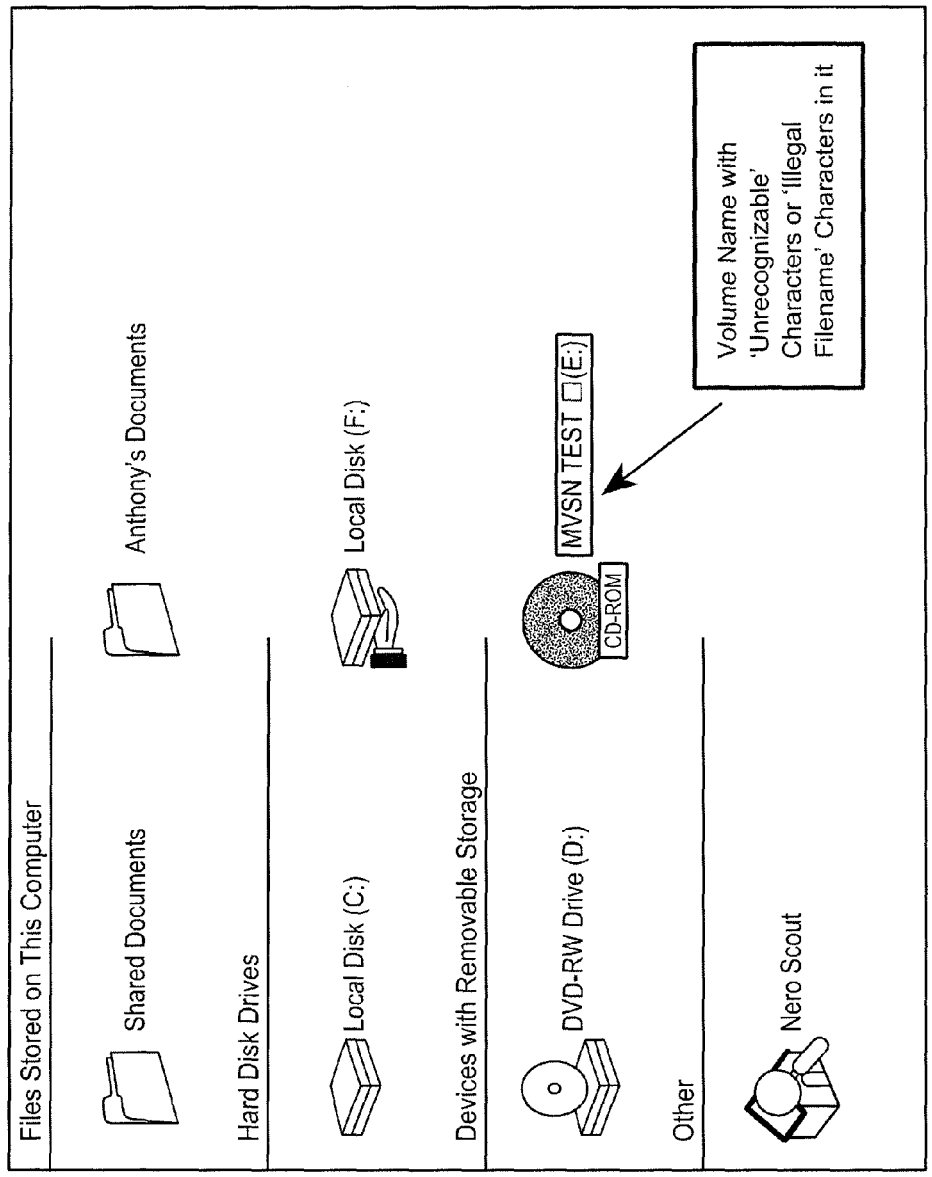
FIG. 3 shows the volume name of FIG. 2.

As an example of copy protected volume names of an optical disc, FIG. 3 (same as FIG. 2) shows the volume name as "MVSN TEST . . . ". In this example, the horizontal ellipsis symbol ". . . " is the 'unrecognizable', 'illegal filename' or non-standard keyboard character (or characters).

Figure 4:
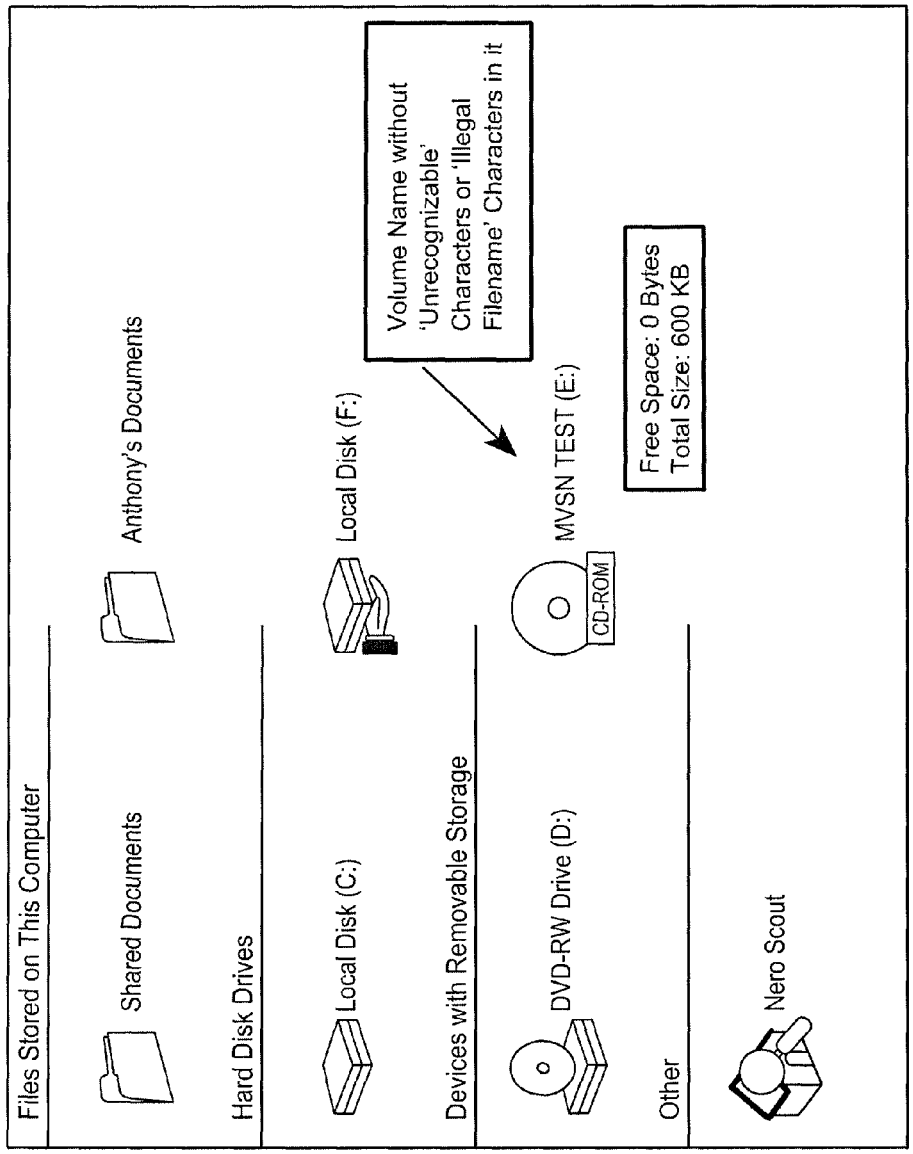
FIG. 4 shows the FIG. 3 representation with the special characters removed.

FIG. 4 displays the resulting altered volume name MVSN TEST without any 'unrecognizable', 'illegal filename' or non-standard keyboard characters in it. The alteration is carried out by, e.g., one of the above four exemplary methods. This altered volume name could also be made into a directory on a hard disk drive or any recordable media, and its content is that of the original content.

A corresponding apparatus for each of the above methods (both copy protection and defeat thereof) is the actual alteration program (code) which executes respectively the methods of FIGS. 2 and 4. Such programs are readily coded by one of ordinary skill in the art in any convenient computer language, in light of this disclosure.

This disclosure is illustrative and not limiting; further modifications will be apparent to those skilled in the art in light of this disclosure and are intended to fall within the scope of the appended claims.

What is claimed:

1. A method processed by a computer processor of copy protecting stored content or data in a computer system environment having an operating system, comprising the acts of:
   providing a volume or directory designating a storage area in a computer storage medium, the volume or directory having a name, the name conforming to requirements of the operating system;
   altering the volume name or the directory name to include at least one character which is the ellipsis symbol "..." and is placed at the end of the volume name or directory name and which is accepted by a file naming convention of the operating system as appropriate respectively for a volume name or directory name, and which prevents copying of content of the volume or directory by one or more copying programs.

2. The method of claim 1, wherein the operating system is a Windows-type operating system.

3. The method of claim 1, wherein the altered volume name or directory name is user defined.

4. The method of claim 1, wherein the altered volume name or directory name is generic.

5. The method of claim 1, wherein the ellipsis symbol "..." is provided by keying on a numeric key pad ALT+0133.

6. A computer readable medium storing computer code for carrying out the method of claim 1.

7. A method processed by a computer processor of circumventing copy protection of a copy protected volume or directory to allow copying of associated files from the copy protected volume or directory, wherein the copy protected volume or directory has at least one copy protected file, the method comprising the acts of:
   creating a new volume or directory,
   assigning a name to the new volume or directory that conforms to name requirements of an associated computer operating system and allows copying thereof, and
   copying the associated files and the at least one copy protected file from the copy protected volume or directory to the new volume or directory; wherein the copy-protected volume or directory has a copy-protected name that includes the ellipsis symbol "..." and which is placed at the end of the volume or directory name and which is accepted by a file naming convention of the operating system as appropriate respectively for a volume name or directory name, and wherein the copy-protected name prevents copying by one or more copying programs.

* * * * *